(12) United States Patent
Haruna et al.

(10) Patent No.: US 9,932,265 B2
(45) Date of Patent: Apr. 3, 2018

(54) METHOD OF MAKING AN OPTICAL FIBER CONTAINING AN ALKALI METAL IN THE CORE

(71) Applicant: SUMITOMO ELECTRIC INDUSTRIES, LTD., Osaka-shi, Osaka (JP)

(72) Inventors: Tetsuya Haruna, Yokohama (JP); Masaaki Hirano, Yokohama (JP); Yoshiaki Tamura, Yokohama (JP); Tetsuya Nakanishi, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/351,782

(22) Filed: Nov. 15, 2016

(65) Prior Publication Data

US 2017/0057867 A1 Mar. 2, 2017

Related U.S. Application Data

(62) Division of application No. 14/651,483, filed as application No. PCT/JP2013/083169 on Dec. 11, 2013, now Pat. No. 9,527,765.

(30) Foreign Application Priority Data

Dec. 12, 2012 (JP) .................. 2012-271333

(51) Int. Cl.
*C03C 3/06* (2006.01)
*G02B 6/02* (2006.01)
(Continued)

(52) U.S. Cl.
CPC ...... *C03C 13/046* (2013.01); *C03B 37/02727* (2013.01); *C03C 3/06* (2013.01);
(Continued)

(58) Field of Classification Search
CPC .............. C03C 2201/23; C03C 13/046; C03C 2203/54; C03C 2201/50; C03B 2205/552;
(Continued)

(56) References Cited

U.S. PATENT DOCUMENTS 3,877,783 A 4/1975 Matsumura et al.
4,318,726 A * 3/1982 Edahiro .............. C03B 37/0142
65/32.2

(Continued)

FOREIGN PATENT DOCUMENTS

CN 102730977 A 10/2012
JP 2002-148465 A 5/2002
(Continued)

OTHER PUBLICATIONS

Masakuni Kuwazuru et al., "Estimation of Long-Term Transmission Loss Increase in Silica-Based Optical Fibers under Hydrogen Atmosphere," Journal of Lightwave Technology, Feb. 1988, pp. 218-225, vol. 6, No. 2.
(Continued)

*Primary Examiner* — Akm Enayet Ullah
(74) *Attorney, Agent, or Firm* — Drinker Biddle & Reath LLP

(57) ABSTRACT

There is provided a method for producing a low-loss alkali metal-doped silica core optical fiber having excellent hydrogen resistance. The method for producing the optical fiber according to the present invention includes a drawing step of drawing an optical fiber preform in a drawing furnace to produce a silica glass-based optical fiber including a core region containing an alkali metal with an average concentration of 0.5 atomic ppm or more and a cladding region that surrounds the core region and a heating step of heating the optical fiber in a heating furnace through which the optical fiber drawn from the drawing furnace passes.

6 Claims, 10 Drawing Sheets

(51) Int. Cl.
  *C03C 13/04*   (2006.01)
  *C03B 37/027*  (2006.01)
(52) U.S. Cl.
  CPC ........ *C03C 13/045* (2013.01); *G02B 6/02395*
    (2013.01); *C03B 2201/50* (2013.01); *C03B*
    *2205/55* (2013.01); *C03B 2205/56* (2013.01);
    *C03C 2201/21* (2013.01); *C03C 2201/23*
    (2013.01); *C03C 2201/50* (2013.01); *C03C*
    *2203/54* (2013.01); *Y02P 40/57* (2015.11)
(58) Field of Classification Search
  CPC .. C03B 2205/56; G02B 6/02395; Y02P 40/57
  See application file for complete search history.

(56) References Cited

U.S. PATENT DOCUMENTS

| | | | |
|---|---|---|---|
| 4,877,753 A * | 10/1989 | Freeman | C23C 16/24 |
| | | | 148/DIG. 122 |
| 5,146,534 A | 9/1992 | Lines | |
| 5,316,562 A * | 5/1994 | Smithgall | C03B 37/0253 |
| | | | 250/559.13 |
| 5,320,658 A * | 6/1994 | Ohga | C03B 37/02718 |
| | | | 65/32.5 |
| 6,153,546 A | 11/2000 | Saitoh et al. | |
| 6,928,840 B1 | 8/2005 | Nagayama et al. | |
| 7,088,900 B1 | 8/2006 | Mishra | |
| 7,469,559 B2 | 12/2008 | Ball et al. | |
| 7,489,850 B1 | 2/2009 | Berkey | |
| 7,536,076 B2 | 5/2009 | Khrapko et al. | |
| 7,565,820 B2 * | 7/2009 | Foster | C03B 37/02718 |
| | | | 65/384 |
| 7,844,155 B2 | 11/2010 | Bickham et al. | |
| 7,876,990 B1 | 1/2011 | Mishra | |
| 8,641,939 B2 * | 2/2014 | Chida | C04B 35/83 |
| | | | 264/212 |
| 8,731,357 B2 * | 5/2014 | Hirano | G02B 6/02019 |
| | | | 385/123 |
| 8,798,412 B2 | 8/2014 | Bookbinder et al. | |
| 8,839,646 B2 * | 9/2014 | Haruna | C03B 37/01211 |
| | | | 65/430 |
| 9,036,972 B2 * | 5/2015 | Tamura | C03B 37/01807 |
| | | | 385/126 |
| 9,097,834 B2 | 8/2015 | Hirano et al. | |
| 9,527,765 B2 * | 12/2016 | Haruna | C03B 37/02727 |
| 2002/0044753 A1 | 4/2002 | Nagayama et al. | |
| 2003/0200772 A1 | 10/2003 | Foster et al. | |
| 2003/0221459 A1 * | 12/2003 | Walczak | C03B 37/01446 |
| | | | 65/398 |
| 2004/0057692 A1 | 3/2004 | Ball et al. | |
| 2005/0063663 A1 * | 3/2005 | Anderson | C03B 37/01211 |
| | | | 385/142 |
| 2005/0213906 A1 * | 9/2005 | Ogura | B29C 35/10 |
| | | | 385/123 |
| 2005/0259932 A1 | 11/2005 | Nagayama et al. | |
| 2006/0130530 A1 | 6/2006 | Anderson et al. | |
| 2007/0297735 A1 | 12/2007 | Khrapko et al. | |
| 2008/0050086 A1 | 2/2008 | Bickham et al. | |
| 2008/0279515 A1 | 11/2008 | Bickham et al. | |
| 2009/0139270 A1 | 6/2009 | Filippov et al. | |
| 2012/0189262 A1 * | 7/2012 | Hirano | C03B 37/01807 |
| | | | 385/142 |
| 2013/0148934 A1 * | 6/2013 | Nakanishi | C03B 37/02718 |
| | | | 385/124 |
| 2013/0341197 A1 * | 12/2013 | Piascik | C25D 5/12 |
| | | | 205/176 |
| 2015/0260912 A1 | 9/2015 | Haruna et al. | |

FOREIGN PATENT DOCUMENTS

| | | |
|---|---|---|
| JP | 2002-148466 A | 5/2002 |
| JP | 2003-261351 A | 9/2003 |
| JP | 2005-537210 A | 12/2005 |
| JP | 2007-504080 A | 3/2007 |
| JP | 2007-513862 A | 5/2007 |
| JP | 4124254 B2 | 7/2008 |
| JP | 2008-536190 A | 9/2008 |
| JP | 4155001 B2 | 9/2008 |
| JP | 4244925 B2 | 3/2009 |
| JP | 2009-541796 A | 11/2009 |
| JP | 4356154 B2 | 11/2009 |
| JP | 4356155 B2 | 11/2009 |
| JP | 2010-501894 A | 1/2010 |
| JP | 4400026 B2 | 1/2010 |
| JP | 4482954 B2 | 6/2010 |
| JP | 4482955 B2 | 6/2010 |
| JP | 2010-168247 A | 8/2010 |
| JP | 2010-526749 A | 8/2010 |
| JP | 2011-505326 A | 2/2011 |
| JP | 4741251 B2 | 8/2011 |
| JP | 2012-020908 A | 2/2012 |
| JP | 2012-162443 A | 8/2012 |
| JP | 2012-167003 A | 9/2012 |
| WO | WO-98/02389 A1 | 1/1998 |
| WO | WO 2013/084765 A1 | 6/2013 |

OTHER PUBLICATIONS

Kazuhiro Noguchi et al., "Loss Increase for Optical Fibers Exposed to Hydrogen Atmosphere," Journal of Lightwave Technology, Apr. 1985, pp. 236-243, vol. LT-3, No. 2.

Yoshiki Chigusa et al., Low-Loss Pure-Silica-Core Fibers and Their Possible Impact on Transmission Systems, Journal of Lightwave Technology, Nov. 2005, pp. 3541-3550, vol. 23, No. 11.

* cited by examiner

FIG. 2

| EXAMPLE | DRAWING SPEED (m/min) | RESIDENCE TIME IN HEATING FURNACE (sec) | TEMPERATURE IN HEATING FURNACE (°C) | TEMPERATURE IN HEATING FURNACE × RESIDENCE TIME IN HEATING FURNACE (°C·sec) | AVERAGE COOLING RATE IN HEATING FURNACE (°C/sec) | TRANSMISSION LOSS (dB/km) | RAYLEIGH SCATTERING COEFFICIENT (dB/km·nm⁴) | LOSS CAUSED BY STRUCTURAL DISORDER (dB/km) |
|---|---|---|---|---|---|---|---|---|
| 1 | 150 | 2.00 | 1500 | 3000 | 50 | 0.147 | 0.705 | 0.002 |
| 2 | 300 | 1.00 | 1500 | 1500 | 100 | 0.15 | 0.715 | 0.0025 |
| 3 | 500 | 0.60 | 1500 | 900 | 210 | 0.152 | 0.725 | 0.0025 |
| 4 | 700 | 0.43 | 1500 | 643 | 460 | 0.153 | 0.73 | 0.003 |
| 5 | 1000 | 0.30 | 1500 | 450 | 830 | 0.155 | 0.74 | 0.003 |
| 6 | 1500 | 0.20 | 1500 | 300 | 1370 | 0.157 | 0.75 | 0.004 |
| 7 | 2500 | 0.12 | 1500 | 180 | 2170 | 0.159 | 0.755 | 0.005 |
| 8 | 150 | 2.00 | 1250 | 2500 | 50 | 0.15 | 0.715 | 0.0025 |
| 9 | 300 | 1.00 | 1250 | 1250 | 210 | 0.153 | 0.725 | 0.003 |
| 10 | 500 | 0.60 | 1250 | 750 | 580 | 0.155 | 0.735 | 0.003 |
| 11 | 700 | 0.43 | 1250 | 536 | 940 | 0.157 | 0.74 | 0.004 |
| 12 | 1000 | 0.30 | 1250 | 375 | 1440 | 0.159 | 0.75 | 0.005 |
| 13 | 1500 | 0.20 | 1250 | 250 | 2150 | 0.16 | 0.76 | 0.005 |
| 14 | 2500 | 0.12 | 1250 | 150 | 3160 | 0.159 | 0.755 | 0.005 |

FIG. 3

| EXAMPLE | DRAWING SPEED (m/min) | RESIDENCE TIME IN HEATING FURNACE (sec) | TEMPERATURE IN HEATING FURNACE (°C) | TEMPERATURE IN HEATING FURNACE × RESIDENCE TIME IN HEATING FURNACE (°C·sec) | AVERAGE COOLING RATE IN HEATING FURNACE (°C/sec) | TRANSMISSION LOSS (dB/km) | RAYLEIGH SCATTERING COEFFICIENT (dB/km·nm⁻⁴) | LOSS CAUSED BY STRUCTURAL DISORDER (dB/km) |
|---|---|---|---|---|---|---|---|---|
| 15 | 150 | 2.00 | 1000 | 2000 | 175 | 0.152 | 0.72 | 0.003 |
| 16 | 300 | 1.00 | 1000 | 1000 | 440 | 0.155 | 0.735 | 0.0035 |
| 17 | 500 | 0.60 | 1000 | 600 | 940 | 0.157 | 0.745 | 0.003 |
| 18 | 700 | 0.43 | 1000 | 429 | 1400 | 0.158 | 0.75 | 0.004 |
| 19 | 1000 | 0.30 | 1000 | 300 | 2000 | 0.16 | 0.76 | 0.005 |
| 20 | 1500 | 0.20 | 1000 | 200 | 2850 | 0.16 | 0.765 | 0.005 |
| 21 | 2500 | 0.12 | 1000 | 120 | 4050 | 0.159 | 0.76 | 0.005 |
| 22 | 150 | 2.00 | 750 | 1500 | 210 | 0.154 | 0.735 | 0.003 |
| 23 | 300 | 1.00 | 750 | 750 | 670 | 0.157 | 0.75 | 0.003 |
| 24 | 500 | 0.60 | 750 | 450 | 1270 | 0.158 | 0.76 | 0.004 |
| 25 | 700 | 0.43 | 750 | 321 | 1810 | 0.16 | 0.77 | 0.004 |
| 26 | 1000 | 0.30 | 750 | 225 | 2510 | 0.162 | 0.78 | 0.004 |
| 27 | 1500 | 0.20 | 750 | 150 | 3460 | 0.16 | 0.77 | 0.005 |
| 28 | 2500 | 0.12 | 750 | 90 | 4810 | 0.159 | 0.76 | 0.005 |

FIG. 4

| EXAMPLE | DRAWING SPEED (m/min) | RESIDENCE TIME IN HEATING FURNACE (sec) | TEMPERATURE IN HEATING FURNACE (°C) | TEMPERATURE IN HEATING FURNACE × RESIDENCE TIME IN HEATING FURNACE (°C·sec) | AVERAGE COOLING RATE IN HEATING FURNACE (°C/sec) | TRANSMISSION LOSS (dB/km) | RAYLEIGH SCATTERING COEFFICIENT (dB/km·nm$^{-4}$) | LOSS CAUSED BY STRUCTURAL DISORDER (dB/km) |
|---|---|---|---|---|---|---|---|---|
| 29 | 150 | 2.00 | 500 | 1000 | 320 | 0.159 | 0.76 | 0.004 |
| 30 | 300 | 1.00 | 500 | 500 | 880 | 0.16 | 0.77 | 0.004 |
| 31 | 500 | 0.60 | 500 | 300 | 1580 | 0.161 | 0.775 | 0.004 |
| 32 | 700 | 0.43 | 500 | 214 | 2180 | 0.162 | 0.78 | 0.004 |
| 33 | 1000 | 0.30 | 500 | 150 | 2940 | 0.162 | 0.78 | 0.004 |
| 34 | 1500 | 0.20 | 500 | 100 | 3960 | 0.16 | 0.77 | 0.0045 |
| 35 | 2500 | 0.12 | 500 | 60 | 5400 | 0.159 | 0.76 | 0.005 |
| 36 | 150 | 2.00 | 32 | 64 | 530 | 0.162 | 0.775 | 0.005 |
| 37 | 300 | 1.00 | 32 | 32 | 1200 | 0.162 | 0.775 | 0.005 |
| 38 | 500 | 0.60 | 32 | 19 | 1970 | 0.161 | 0.77 | 0.0055 |
| 39 | 700 | 0.43 | 32 | 14 | 2590 | 0.162 | 0.78 | 0.005 |
| 40 | 1000 | 0.30 | 32 | 10 | 3360 | 0.162 | 0.775 | 0.005 |
| 41 | 1500 | 0.20 | 32 | 6 | 4370 | 0.16 | 0.765 | 0.005 |
| 42 | 2500 | 0.12 | 32 | 4 | 5800 | 0.159 | 0.76 | 0.005 |

FIG. 6

| COMPARATIVE EXAMPLE | DRAWING SPEED (m/min) | RESIDENCE TIME IN HEATING FURNACE (sec) | TEMPERATURE IN HEATING FURNACE (°C) | TEMPERATURE IN HEATING FURNACE × RESIDENCE TIME IN HEATING FURNACE (°C·sec) | AVERAGE COOLING RATE IN HEATING FURNACE (°C/sec) | TRANSMISSION LOSS (dB/km) | RAYLEIGH SCATTERING COEFFICIENT (dB/km·nm$^{-4}$) | LOSS CAUSED BY STRUCTURAL DISORDER (dB/km) |
|---|---|---|---|---|---|---|---|---|
| 1 | 150 | 2.00 | 1500 | 3000 | 50 | 0.155 | 0.745 | 0.002 |
| 2 | 300 | 1.00 | 1500 | 1500 | 100 | 0.158 | 0.765 | 0.002 |
| 3 | 500 | 0.60 | 1500 | 900 | 210 | 0.161 | 0.78 | 0.002 |
| 4 | 700 | 0.43 | 1500 | 643 | 460 | 0.164 | 0.79 | 0.002 |
| 5 | 1000 | 0.30 | 1500 | 450 | 830 | 0.168 | 0.82 | 0.002 |
| 6 | 1500 | 0.20 | 1500 | 300 | 1370 | 0.171 | 0.84 | 0.002 |
| 7 | 2500 | 0.12 | 1500 | 180 | 2170 | 0.171 | 0.84 | 0.002 |

FIG. 8

| EXAMPLE | DRAWING SPEED (m/min) | RESIDENCE TIME IN HEATING FURNACE (sec) | TEMPERATURE IN HEATING FURNACE (°C) | WITH DEUTERIUM TREATMENT TRANSMISSION LOSS INCREASE IN EACH OF WAVELENGTH RANGES | | | WITHOUT DEUTERIUM TREATMENT TRANSMISSION LOSS INCREASE IN EACH OF WAVELENGTH RANGES | | |
|---|---|---|---|---|---|---|---|---|---|
| | | | | 1550nm | MAXIMUM AT 1530 TO 1570 nm | MAXIMUM AT 1560 TO 1620 nm | 1380nm | 1550nm | MAXIMUM AT 1530 TO 1570 nm | MAXIMUM AT 1560 TO 1620 nm | 1380nm |

| EXAMPLE | DRAWING SPEED (m/min) | RESIDENCE TIME IN HEATING FURNACE (sec) | TEMPERATURE IN HEATING FURNACE (°C) | 1550nm | MAX 1530-1570 nm | MAX 1560-1620 nm | 1380nm | 1550nm | MAX 1530-1570 nm | MAX 1560-1620 nm | 1380nm |
|---|---|---|---|---|---|---|---|---|---|---|---|
| 1 | 150 | 2.00 | 1500 | 0 | 0 | 0 | 0.002 | 0 | 0.001 | 0.001 | 0.005 |
| 2 | 300 | 1.00 | 1500 | 0.001 | 0.001 | 0 | 0.003 | 0.001 | 0.002 | 0.002 | 0.007 |
| 3 | 500 | 0.60 | 1500 | 0.001 | 0.002 | 0.001 | 0.004 | 0.002 | 0.002 | 0.002 | 0.007 |
| 4 | 700 | 0.43 | 1500 | 0.001 | 0.002 | 0.002 | 0.004 | 0.002 | 0.002 | 0.003 | 0.008 |
| 5 | 1000 | 0.30 | 1500 | 0.001 | 0.002 | 0.002 | 0.005 | 0.002 | 0.003 | 0.003 | 0.01 |
| 6 | 1500 | 0.20 | 1500 | 0.0015 | 0.0025 | 0.0025 | 0.006 | 0.0025 | 0.003 | 0.004 | 0.008 |
| 7 | 2500 | 0.12 | 1500 | 0.002 | 0.003 | 0.003 | 0.007 | 0.0034 | 0.004 | 0.006 | 0.01 |
| 15 | 150 | 2.00 | 1000 | 0 | 0 | 0.001 | 0.003 | 0.001 | 0.002 | 0.001 | 0.009 |
| 16 | 300 | 1.00 | 1000 | 0.001 | 0.001 | 0.001 | 0.004 | 0.002 | 0.003 | 0.003 | 0.01 |
| 17 | 500 | 0.60 | 1000 | 0.002 | 0.002 | 0.002 | 0.004 | 0.002 | 0.003 | 0.003 | 0.01 |
| 18 | 700 | 0.43 | 1000 | 0.002 | 0.002 | 0.002 | 0.006 | 0.003 | 0.003 | 0.004 | 0.009 |
| 19 | 1000 | 0.30 | 1000 | 0.001 | 0.002 | 0.002 | 0.008 | 0.003 | 0.004 | 0.005 | 0.01 |
| 20 | 1500 | 0.20 | 1000 | 0.002 | 0.003 | 0.002 | 0.007 | 0.003 | 0.004 | 0.006 | 0.011 |
| 21 | 2500 | 0.12 | 1000 | 0.002 | 0.003 | 0.002 | 0.008 | 0.003 | 0.005 | 0.006 | 0.012 |

FIG. 9

| EXAMPLE | DRAWING SPEED (m/min) | RESIDENCE TIME IN HEATING FURNACE (sec) | TEMPERATURE IN HEATING FURNACE (°C) | WITH DEUTERIUM TREATMENT TRANSMISSION LOSS INCREASE IN EACH OF WAVELENGTH RANGES | | | | WITHOUT DEUTERIUM TREATMENT TRANSMISSION LOSS INCREASE IN EACH OF WAVELENGTH RANGES | | | |
|---|---|---|---|---|---|---|---|---|---|---|---|
| | | | | 1550nm | MAXIMUM AT 1530 TO 1570 nm | MAXIMUM AT 1560 TO 1620 nm | 1380nm | 1550nm | MAXIMUM AT 1530 TO 1570 nm | MAXIMUM AT 1560 TO 1620 nm | 1380nm |
| 29 | 150 | 2.00 | 500 | 0.001 | 0.001 | 0.002 | 0.005 | 0.002 | 0.003 | 0.002 | 0.013 |
| 30 | 300 | 1.00 | 500 | 0.002 | 0.002 | 0.002 | 0.006 | 0.002 | 0.004 | 0.003 | 0.014 |
| 31 | 500 | 0.60 | 500 | 0.001 | 0.002 | 0.003 | 0.008 | 0.003 | 0.004 | 0.004 | 0.014 |
| 32 | 700 | 0.43 | 500 | 0.002 | 0.003 | 0.003 | 0.007 | 0.004 | 0.004 | 0.005 | 0.015 |
| 33 | 1000 | 0.30 | 500 | 0.002 | 0.003 | 0.003 | 0.008 | 0.003 | 0.005 | 0.007 | 0.014 |
| 34 | 1500 | 0.20 | 500 | 0.002 | 0.002 | 0.004 | 0.009 | 0.003 | 0.004 | 0.006 | 0.015 |
| 35 | 2500 | 0.12 | 500 | 0.003 | 0.003 | 0.003 | 0.009 | 0.004 | 0.005 | 0.007 | 0.014 |
| 36 | 150 | 2.00 | 32 | 0.002 | 0.003 | 0.003 | 0.01 | 0.003 | 0.005 | 0.007 | 0.015 |
| 37 | 300 | 1.00 | 32 | 0.003 | 0.004 | 0.003 | 0.009 | 0.003 | 0.004 | 0.008 | 0.015 |
| 38 | 500 | 0.60 | 32 | 0.002 | 0.003 | 0.004 | 0.01 | 0.003 | 0.005 | 0.007 | 0.015 |
| 39 | 700 | 0.43 | 32 | 0.002 | 0.003 | 0.003 | 0.011 | 0.004 | 0.005 | 0.007 | 0.015 |
| 40 | 1000 | 0.30 | 32 | 0.003 | 0.003 | 0.004 | 0.01 | 0.003 | 0.006 | 0.008 | 0.016 |
| 41 | 1500 | 0.20 | 32 | 0.002 | 0.004 | 0.003 | 0.011 | 0.003 | 0.005 | 0.007 | 0.015 |
| 42 | 2500 | 0.12 | 32 | 0.002 | 0.003 | 0.003 | 0.01 | 0.004 | 0.005 | 0.007 | 0.016 |

METHOD OF MAKING AN OPTICAL FIBER CONTAINING AN ALKALI METAL IN THE CORE

This is a divisional application of copending application Ser. No. 14/651,483, having a § 371 date of Jun. 11, 2015, which is a national stage filing based on PCT International Application No. PCT/JP2013/083169 filed on Dec. 11, 2013. The copending application Ser. No. 14/651,483 is incorporated by reference herein in its entirety.

TECHNICAL FIELD

The present invention relates to a method for producing an optical fiber and an optical fiber.

BACKGROUND ART

An optical fiber (e.g., optical fiber conforming to ITU-T G.652 standard) including a core made of silica glass containing $GeO_2$, which is a dopant for increasing the refractive index, is referred to as a "$GeO_2$-doped silica core optical fiber" in this Description. An optical fiber including a core made of substantially pure silica glass without containing a dopant for increasing the refractive index (e.g., $GeO_2$ and $Al_2O_3$) is referred to as a "pure silica core optical fiber" in this Description. The pure silica core optical fiber has low transmission loss and good long-term reliability such as hydrogen resistance and radiation resistance compared with the $GeO_2$-doped silica core optical fiber (refer to Y. Chigusa, et al., J. LIGHTW. TECHNOL., VOL. 23, NO. 11, pp. 3541-3550, 2005). The $GeO_2$-doped silica core optical fiber is sometimes exposed to deuterium gas ($D_2$) under certain conditions in order to improve the hydrogen resistance (refer to JP2003-261351A). On the other hand, the pure silica core optical fiber has good hydrogen resistance and thus the exposure to deuterium gas is generally not required.

When an optical fiber is produced by drawing an optical fiber preform, a heating furnace is disposed near the downstream of a drawing furnace. An optical fiber immediately after the drawing process is caused to pass through the heating furnace, and the optical fiber is heated to a predetermined temperature range when passing through the heating furnace. By reheating the optical fiber immediately after the drawing process by the heating furnace, the optical fiber after the drawing process is prevented from being rapidly cooled and thus is slowly cooled. It is known that the relaxation of the network structure of glass due to rearrangement of atoms is facilitated when the optical fiber is heated in the heating furnace, which decreases the fictive temperature Tf in the optical fiber and reduces the Rayleigh scattering intensity in the optical fiber, resulting in a reduction in the transmission loss of the optical fiber (refer to JP4482955B, JP 4482954B, JP4356155B, JP4356154B, JP 2002-148465A, JP4 400026B, JP4155001B, JP4 244925B, JP4124254B, JP4741251B, JP 2011-505326A, and U.S. Pat. No. 7,876,990B).

In order to reduce the transmission loss of pure silica core optical fibers to, for example, 0.155 dB/km or less at a wavelength of 1550 nm by using such a heating furnace, the relaxation of the network structure of glass needs to be further facilitated by lengthening the heating furnace to several tens of meters or decreasing the drawing speed (speed at which an optical fiber is drawn from a drawing furnace) to several tens of meters per minute. However, in the former, it is difficult to realize such optical fiber production facilities. In the latter, the productivity considerably degrades.

"Alkali metal-doped silica core optical fibers" are known as optical fibers in which Rayleigh scattering intensity can be decreased (refer to JP2005-537210A, US2006/0130530A, JP2007-504080A, JP 2008-536190A, JP 2010-501894A, JP 2009-541796A, JP 2010-526749A, WO98/002389, and U.S. Pat. No. 5,146,534B). Alkali metal-doped silica core optical fibers are optical fibers including a core made of silica glass containing an alkali metal (e.g., Na and potassium) in a trace amount of 500 ppm or less without containing a dopant for increasing the refractive index, such as $GeO_2$ or $Al_2O_3$. If a core portion of an optical fiber preform contains an alkali metal, the viscosity of the core portion can be decreased when the optical fiber preform is drawn, and thus the network structure of silica glass is relaxed. Therefore, it is said that the fictive temperature Tf in the optical fiber decreases, which can reduce the transmission loss. In the core of alkali metal-doped silica core optical fibers, not only the amount of an alkali metal added, but also the amount of a halogen such as Cl or fluorine added is a trace amount.

SUMMARY OF INVENTION

Technical Problem

It is an object of the present invention to provide a low-loss alkali metal-doped silica core optical fiber having excellent hydrogen resistance and a method for producing the optical fiber.

Solution to Problem

To achieve the object, there is provided a method for producing an optical fiber, the method including a drawing step of drawing an optical fiber preform in a drawing furnace to produce a silica glass-based optical fiber including a core region containing an alkali metal with an average concentration of 0.5 atomic ppm or more and a cladding region that surrounds the core region and a heating step of heating the optical fiber in a heating furnace through which the optical fiber drawn from the drawing furnace passes.

In the method for producing an optical fiber according to the present invention, the temperature in the heating furnace in the heating step may be 700° C. or more, 1000° C. or more, or 1000° C. or more and 1500° C. or less. In the heating step, the residence time of the optical fiber in the heating furnace may be 0.2 seconds or more or 0.2 seconds or more and 2 seconds or less. In the method for producing an optical fiber according to the present invention, in the heating step, the product of the residence time of the optical fiber in the heating furnace and the average temperature in the heating furnace may be 480 (s·° C.) or more. In the drawing step, the drawing speed may be 150 m/min or more or 150 m/min or more and 1000 m/min or less. The alkali metal may be potassium.

In another aspect of the present invention, there is provided a silica glass-based optical fiber including a core region containing an alkali metal with an average concentration of 0.5 atomic ppm or more and a cladding region that surrounds the core region. The transmission loss at a wavelength of 1550 nm is 0.158 dB/km or less. A transmission loss increase at a wavelength of 1550 nm is 0.003 dB/km or less, the increase being caused by exposing the optical fiber to a hydrogen atmosphere with a hydrogen partial pressure of 1 kPa at 25° C. for 720 hours.

Alternatively, there is provided a silica glass-based optical fiber including a core region containing an alkali metal with an average concentration of 0.5 atomic ppm or more and a cladding region that surrounds the core region. The transmission loss at a wavelength of 1550 nm is 0.158 dB/km or less. A transmission loss increase at wavelengths of 1560 nm to 1620 nm is 0.005 dB/km or less, the increase being caused by exposing the optical fiber to a hydrogen atmosphere with a hydrogen partial pressure of 1 kPa at 25° C. for 720 hours.

Furthermore, there is provided a silica glass-based optical fiber including a core region containing an alkali metal with an average concentration of 0.5 atomic ppm or more and a cladding region that surrounds the core region. The transmission loss at a wavelength of 1550 nm is 0.158 dB/km or less. The optical fiber is an optical fiber exposed to a deuterium atmosphere with a deuterium partial pressure of 2 kPa at 40° C. for 24 hours; and a transmission loss increase at a wavelength of 1550 nm is 0.002 dB/km or less, the increase being caused by exposing the optical fiber to a hydrogen atmosphere with a hydrogen partial pressure of 1 kPa at 25° C. for 720 hours.

Alternatively, there is provided a silica glass-based optical fiber including a core region containing an alkali metal with an average concentration of 0.5 atomic ppm or more and a cladding region that surrounds the core region. The transmission loss at a wavelength of 1550 nm is 0.158 dB/km or less. The optical fiber is an optical fiber exposed to a deuterium atmosphere with a deuterium partial pressure of 2 kPa at 40° C. for 24 hours; and a transmission loss increase at wavelengths of 1560 nm to 1620 nm is 0.003 dB/km or less, the increase being caused by exposing the optical fiber to a hydrogen atmosphere with a hydrogen partial pressure of 1 kPa at 25° C. for 720 hours.

Advantageous Effects of Invention

According to the present invention, a low-loss alkali metal-doped silica core optical fiber having excellent hydrogen resistance can be produced.

BRIEF DESCRIPTION OF DRAWINGS

FIG. 2 is a table showing several production conditions and several characteristics of optical fibers in Examples.

FIG. 3 is a table showing several production conditions and several characteristics of optical fibers in Examples.

FIG. 4 is a table showing several production conditions and several characteristics of optical fibers in Examples.

FIG. 6 is a table showing several production conditions and several characteristics of optical fibers in Comparative Examples.

FIG. 8 is a table showing a transmission loss increase with or without a deuterium treatment for optical fibers in Examples.

FIG. 9 is a table showing a transmission loss increase with or without a deuterium treatment for optical fibers in Examples.

DESCRIPTION OF EMBODIMENTS

Figure 1:
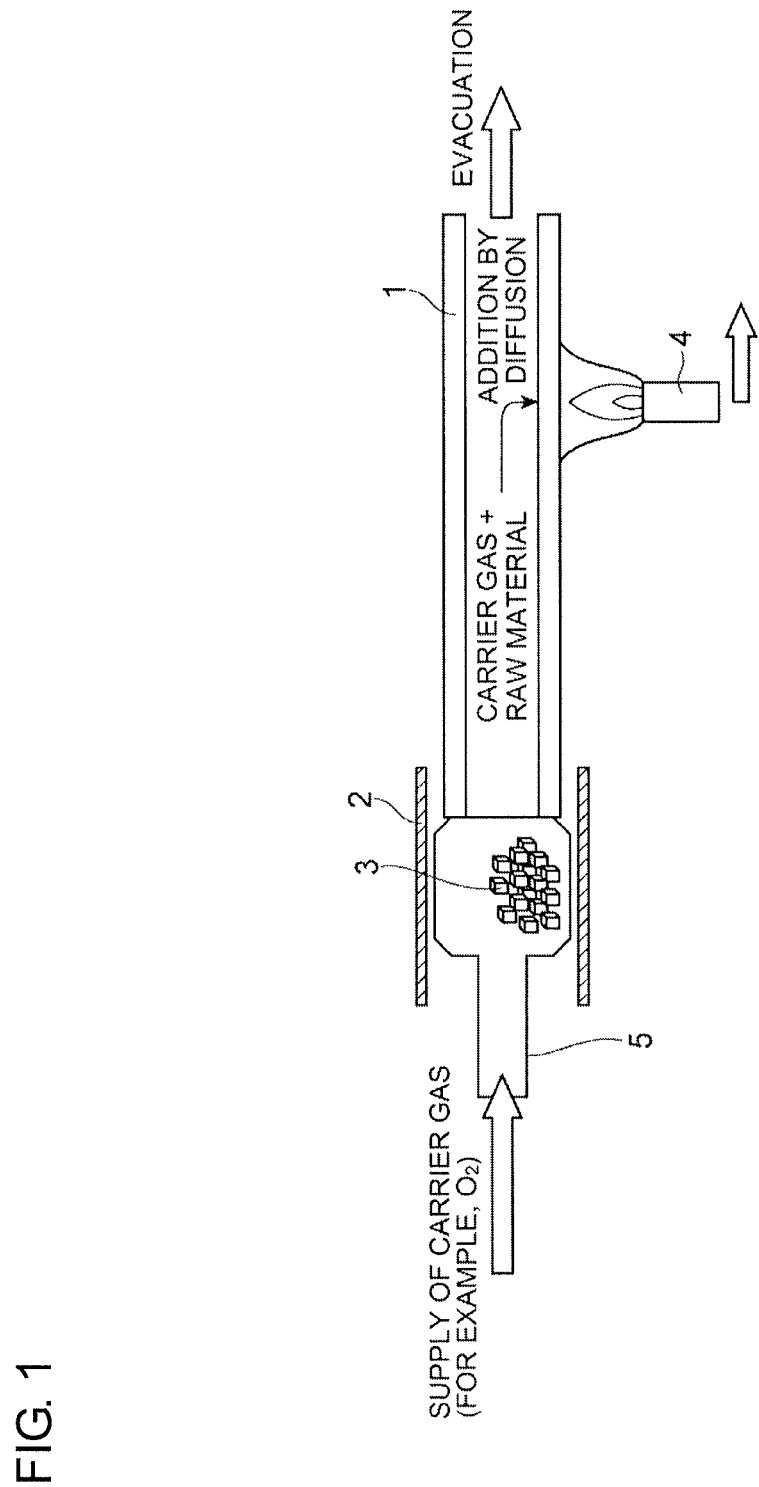
FIG. 1 is a conceptual diagram showing a thermal diffusion step in an optical fiber preform-manufacturing step in an embodiment of the present invention.

Hereafter, embodiments of the present invention will be described with reference to the attached drawings. The drawings are used to describe the invention and do not limit the scope of the invention. The dimensional ratios in the drawings are not necessarily exact.

Alkali metals have relatively high mobility in a silica glass network. Therefore, the silica glass network containing an alkali metal is easily broken and defect centers such as a non-bridging oxygen hole center are easily caused. Thus, according to the findings of the present inventors, the alkali metal-doped silica core optical fiber may have poor hydrogen resistance compared with the pure silica core optical fiber.

The hydrogen resistance indicates the stability of the transmission loss of optical fibers against hydrogen atoms and is one of the items concerning long-term reliability of optical fibers. Hydrogen gas generated from, for example, a coating material around a glass portion and a metal in an optical fiber cable gradually penetrates the glass portion of the optical fiber over a long period of several years or more. This causes a reaction and generates an OH group and defect centers, which may increase the transmission loss. It is known that, by conducting an accelerated test to study the dependence of the reactivity between a produced optical fiber and hydrogen on temperature, hydrogen partial pressure, and time, a transmission loss increase caused by the reaction with hydrogen during the service life in an environment in which the optical fiber is to be used can be estimated.

The present inventors have further found that, in the alkali metal-doped silica core optical fiber, an additional gradual transmission loss increase is generated in a range from about 1500 nm to longer wavelengths by a hydrogen treatment. As described above, the alkali metal-doped silica core optical fiber has a problem in that the hydrogen resistance, which is one of the items concerning the long-term reliability, may be degraded. The alkali metal-doped silica core optical fiber also has a problem in that an increase in the concentration of an alkali metal facilitates the relaxation of the network structure of glass and reduces Rayleigh scattering loss, but the structural disorder in the glass increases, which may increase the transmission loss that is not dependent on wavelength.

A method for producing an optical fiber according to the present invention includes a preform-manufacturing step, a drawing step, and a heating step, and an alkali metal-doped silica core optical fiber is produced. In the preform-manufacturing step according to an embodiment, a silica glass-based optical fiber preform including a core containing an alkali metal with an average concentration of 0.5 atomic ppm or more is manufactured. In the drawing step, the optical fiber preform is drawn in a drawing furnace to produce an optical fiber. In the heating step, the optical fiber is heated in a heating furnace disposed between the downstream of the drawing furnace and a die with which a resin is applied to the optical fiber.

FIG. 1 is a conceptual diagram showing a thermal diffusion step in an optical fiber preform-manufacturing step in an embodiment of the present invention. In the preform-manufacturing step, first, a silica glass pipe 1 is prepared. The silica glass pipe 1 contains 100 atomic ppm Cl and 6,000 atomic ppm fluorine, and the concentrations of other dopants are below the lower limit of detection (about 1 ppm). The silica glass pipe 1 has an outside diameter of 32 mm and an inside diameter of 15 mm. A handling glass pipe 5 is connected to one end of the glass pipe 1. Part of the handling glass pipe 5 is used as a raw material storage space, and an alkali metal salt raw material (KBr) 3 is placed in the raw material storage space. Note that part of the glass pipe 1 may be used as the raw material storage space.

First, a state in which the outside of the raw material storage space is heated to 680° C. by an external heat source (electric furnace) 2 is maintained for one hour while dry nitrogen (dew point: −76° C. or less) is introduced into the raw material storage space as a carrier gas at 15 SLM (15 L/min in the standard conditions) (drying step). Thus, the alkali metal salt raw material 3 in the raw material storage space is dried. The temperature of the outside of the raw material storage space in the drying step is 270° C. or more and less than the melting point of the alkali metal salt raw material, and preferably 800° C. or less.

The temperature of the raw material storage space is adjusted to 860° C. The outer surface of the glass pipe 1 is heated by an external heat source (oxyhydrogen burner) 4 so as to have a temperature of 2000° C. while dry oxygen is introduced into the raw material storage space and the glass pipe 1 as a carrier gas at 1 SLM (thermal diffusion step). Herein, the oxyhydrogen burner is moved at a speed of 30 mm/min. By performing the movement 15 times in total, potassium is diffused to the inner surface of the glass pipe 1.

Subsequently, the inside diameter of the glass pipe 1 to which the alkali metal has been diffused is reduced to about 4 mm while the glass pipe 1 is heated by the oxyhydrogen burner 4 (diameter-reducing step). After the diameter-reducing step, vapor phase etching is performed on the inner surface of the glass pipe 1 until the diameter of the inner surface reaches about 5 mm by heating the glass pipe 1 to 2000° C. by the oxyhydrogen burner 4 while $SF_6$ and $Cl_2$ are supplied to the glass pipe 1 from a gas supply unit (etching step). After the etching step, the glass pipe 1 is collapsed by heating the glass pipe 1 to about 1400° C. by the oxyhydrogen burner 4 while the glass pipe 1 is evacuated so that the internal pressure of the pipe is an absolute pressure of about 100 kPa. Thus, an alkali metal-doped glass rod having an outside diameter of about 25 mm is obtained (collapsing step).

After the collapsing step, the outside of the glass rod is thoroughly ground until OH groups are eliminated (specifically, until the outside diameter reaches about 70% or less of the outside diameter after the collapsing) to form a first core rod. A second core having a diameter about three times larger than that of the first core rod is disposed outside the first core rod. The second core is made of a silica glass containing 6,000 ppm of Cl on average and 1 ppm or less of other dopants.

The first core rod and the second core constitute a core portion, and a fluorine-containing silica glass serving as a first cladding portion is formed outside the core portion. The relative refractive index difference between the second core and the first cladding portion, which is expressed as (refractive index of second core−refractive index of first cladding portion)/refractive index of second core, is about 0.33% at the maximum. Furthermore, a fluorine-doped silica glass serving as a second cladding portion is formed outside the first cladding portion. The relative refractive index difference between the second core and the second cladding portion, which is expressed as (refractive index of second core−refractive index of second cladding portion)/refractive index of second core, is about 0.23%. Thus, an optical fiber preform is obtained.

The core of the optical fiber preform contains 1000 atomic ppm or more of alkali metal and chlorine on average, and it is desirable that the core substantially does not contain (namely only contains 0.5 atomic ppm or less of) Ge, Al, and P and transition metals such as Fe, Ni, and Cu. The core of the optical fiber preform may contain a fluorine atom. This allows the transmission loss of the optical fiber to decrease to 0.18 dB/km or less.

In this case, the refractive index of the cladding portion of the optical fiber preform is desirably decreased to a refractive index lower than the average refractive index of the core portion by using a fluorine-doped silica glass. The core of the optical fiber preform may contain an alkali metal having a concentration of 500 atomic ppm or more in terms of peak value. The transmission loss at a wavelength of 1550 nm of an optical fiber to be produced using the optical fiber preform can be decreased to 0.16 dB/km.

In the drawing step, an optical fiber is produced by drawing the optical fiber preform. The optical fiber includes a core region containing an alkali metal (potassium) having an average concentration of 0.5 atomic ppm or more and a cladding region that surrounds the core region. In the heating step, the optical fiber is heated in a heating furnace disposed downstream of the drawing furnace. If the heating furnace is disposed below the drawing furnace, the heating furnace may be continuous with the drawing furnace.

When the drawing speed in the drawing step is 500 m/min, the temperature of the heating furnace in the heating step is 1500° C., and the length of the heating furnace is 5 m, the characteristics of the produced optical fiber are, for example, shown in Table 1, and the produced optical fiber is an optical fiber with low transmission loss.

TABLE 1

| Item | Unit | | Characteristic value |
|---|---|---|---|
| Concentration of potassium in core | Average | atomic ppm | 0.5 to 100 |
| Transmission loss | @1300 | nm dB/km | 0.250 to 0.300 |
| Transmission loss | @1550 | nm dB/km | 0.151 to 0.155 |
| Chromatic dispersion | @1550 | nm ps/nm/km | +20.0 to +21.5 |
| Dispersion slope | @1550 | nm ps/nm$^2$/km | +0.055 to +0.065 |
| Effective area | @1550 | nm μm$^2$ | 125 to 145 |
| Mode field diameter | @1550 | nm μm | 12 to 14 |
| Fiber cut-off wavelength | 2 | m nm | 1400 to 1600 |

TABLE 1-continued

| Item | Unit | | Characteristic value |
|---|---|---|---|
| Cable cut-off wavelength | 22 m | nm | 1300 to 1500 |
| Polarization mode dispersion | C, L-band | ps/√km | 0.001 to 0.015 |
| Nonlinear refractive index N2 | @1550 nm, random polarization state | $10^{-20} m^2/W$ | 2.1 to 2.2 |
| Nonlinear coefficient | @1550 nm, random polarization state | $(W \cdot km)^{-1}$ | 0.6 to 0.7 |

The preferred structure and characteristics of the optical fiber are, for example, as follows. The transmission loss of the optical fiber at a wavelength of 1550 nm is desirably 0.160 dB/km or less, more desirably 0.155 dB/km or less, and further desirably 0.153 dB/km or less. The effective area may be about 70 to 160 μm² at a wavelength of 1550 nm. The chromatic dispersion at a wavelength of 1550 nm may be +15 to +22 ps/nm/km. The zero dispersion wavelength may be 1250 nm or more and 1350 nm or less. The dispersion slope may be +0.05 to +0.07 ps/nm²/km at a wavelength of 1550 nm. The transmission loss at a wavelength of 1380 nm is preferably 0.8 dB/km or less, more preferably 0.4 dB/km or less, and most preferably 0.3 dB/km or less.

The polarization mode dispersion at a wavelength of about 1550 nm may be 0.2 ps/√km or less. The cable cut-off wavelength may be 1530 nm or less, and is preferably 1450 nm or less, which is a pump wavelength used for Raman amplification or may be 1260 nm or less, which is a cable cut-off wavelength of standard single-mode fibers. The diameter of the core portion is about 5 to 15 μm. The relative refractive index difference between the core portion and the cladding portion, which is expressed as (refractive index of core portion−refractive index of cladding portion)/refractive index of core portion, is about 0.1 to 0.7%. The outside diameter of a glass portion in the optical fiber may be about 110 to 150 μm, and the outside diameter of the optical fiber coated with resin may be about 200 to 300 μm. Such an optical fiber is particularly suitably used as an optical transmission line of an optical transmission system in the long-haul optical communication.

The present inventors have found the following. When an optical fiber is produced by drawing a silica glass-based optical fiber preform including a core containing an alkali metal having an average concentration of 0.5 atomic ppm or more, a low-loss alkali metal-doped silica core optical fiber having excellent hydrogen resistance (i.e., the transmission loss caused by structural disorder can be reduced) can be produced at a high drawing speed (efficiently) by heating the optical fiber in a heating furnace through which the optical fiber drawn from a drawing furnace passes.

That is, the length of the heating furnace can be 5 m, which does not pose a problem in terms of a drawing tower structure. The drawing speed can be 150 m/min or more, which does not considerably decrease the productivity. Furthermore, the transmission loss can be reduced. In addition, by controlling the concentration of the alkali metal contained in the core portion of the optical fiber preform to 100 atomic ppm or less and also by controlling the drawing speed and the length of the heating furnace within the predetermined ranges, the hydrogen resistance of the optical fiber is considerably improved compared with an optical fiber produced without disposing the heating furnace. In particular, the additional gradual transmission loss increase in a range from about 1500 nm to longer wavelengths is considerably suppressed compared with an optical fiber produced without disposing the heating furnace. This may be because defect centers present in the produced alkali metal-doped silica core optical fiber are restored by relaxation of a glass network structure when the optical fiber passes through the heating furnace, and thus the number of defect centers is decreased.

The optical fiber is preferably exposed to deuterium ($D_2$) gas at 20° C. or more (preferably 40° C. or more) in advance under conditions that satisfy ($D_2$ partial pressure)× (treatment time)=50 kPa·hour or more. As a result, the present inventors have also found that the degradation of the transmission loss caused by the reaction between the alkali metal-doped silica core optical fiber and hydrogen in the transmission bandwidth (e.g., wavelength range of 1300 nm to 1600 nm) is suppressed, and the hydrogen resistance is further improved. The transmission loss at a wavelength of 1550 nm is 0.158 dB/km, preferably 0.154 dB/km, and more preferably 0.152 dB/km or less. A transmission loss increase at a wavelength of 1550 nm after hydrogen exposure is 0.003 dB/km or less and preferably 0.002 dB/km or less. A transmission loss increase at 1520 to 1620 nm after hydrogen exposure is 0.005 dB/km or less and preferably 0.003 dB/km.

FIG. 2 is a table showing several conditions (drawing speed, residence time of optical fiber in heating furnace, temperature in heating furnace, product of temperature in heating furnace and residence time in heating furnace, and average cooling rate of optical fiber in heating furnace) and several characteristics (transmission loss at a wavelength of 1550 nm, Rayleigh scattering coefficient, and loss caused by structural disorder) of optical fibers in Examples 1 to 14. FIG. 3 is a table showing several conditions and several characteristics of optical fibers in Examples 15 to 28. FIG. 4 is a table showing several conditions and several characteristics of optical fibers in Examples 29 to 42. In each of Examples, an optical fiber was produced by drawing a silica glass-based optical fiber preform including a core containing potassium having a concentration of 15 to 60 atomic ppm. The potassium concentration in a core of the produced optical fiber was 0.5 to 2 atomic ppm. For the temperature in the heating furnace and the drawing speed, 42 conditions were set as shown in FIG. 2 to FIG. 4. The length of the heating furnace was 5 m.

Figure 5:
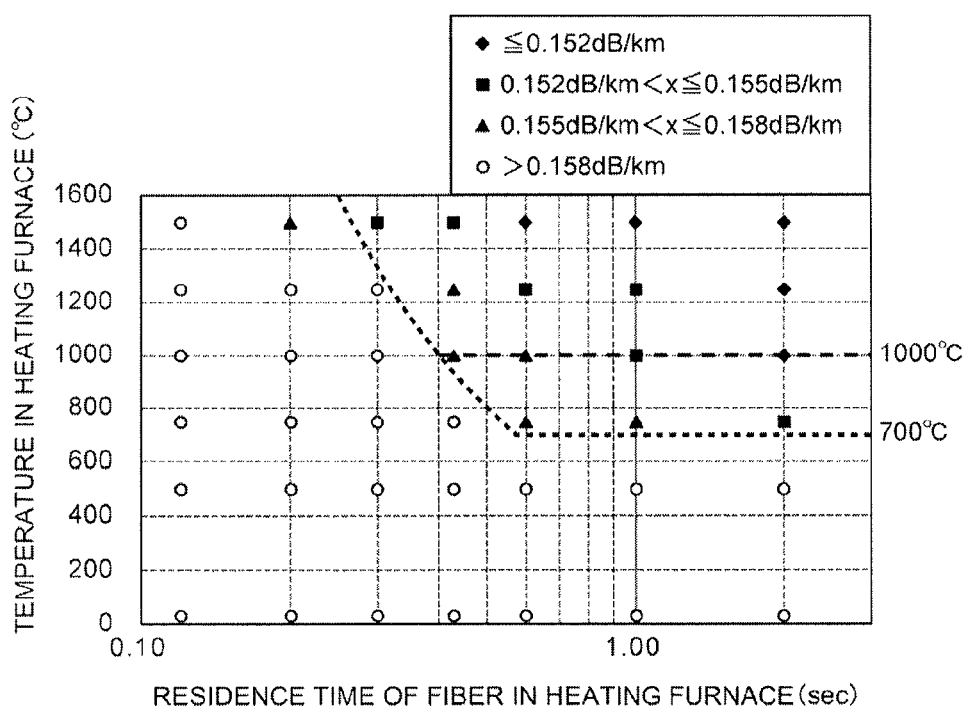
FIG. 5 is a graph showing the relationships between the residence time of an optical fiber in a heating furnace, the temperature in a heating furnace, and the transmission loss of an optical fiber at a wavelength of 1550 nm for optical fibers in Examples.

FIG. 5 is a graph showing the relationships between the residence time of the optical fiber in the heating furnace, the temperature in the heating furnace, and the transmission loss of the optical fiber at a wavelength of 1550 nm for each of the optical fibers of Examples 1 to 42. The horizontal axis shows the residence time of the optical fiber in the heating furnace. The vertical axis shows the temperature in the heating furnace. As the temperature in the heating furnace increases and the residence time of the optical fiber in the heating furnace increases, the Rayleigh scattering loss and the loss caused by structural disorder can be reduced, which can reduce the transmission loss. When the temperature in the heating furnace is 700° C. or more and the product of the temperature in the heating furnace and the residence time is 480° C.s or more, the transmission loss of the optical fiber at a wavelength of 1550 nm can be controlled to 0.158 dB/km or less. The temperature in the heating furnace is desirably 1000° C. or more.

In consideration of practicability of facilities, the temperature in the heating furnace is 1500° C. with the current technology, but may be increased to about 2000° C. in the future. In that case, the transmission loss can be further reduced at a higher drawing speed. The residence time of the optical fiber in the heating furnace is preferably 0.3 seconds or more, and is desirably 2 seconds or less in view of productivity.

FIG. 6 is a table showing several conditions (drawing speed, residence time of optical fiber in heating furnace, temperature in heating furnace, product of temperature in heating furnace and residence time in heating furnace, and average cooling rate of optical fiber in heating furnace) and several characteristics (transmission loss at a wavelength of 1550 nm, Rayleigh scattering coefficient, and loss caused by structural disorder) of optical fibers in Comparative Examples 1 to 7. Each of the optical fibers in Comparative Examples 1 to 7 is a pure silica core optical fiber whose core does not contain an alkali metal. The temperature in the heating furnace was set to 1500° C., and the drawing speed was any of seven conditions shown in FIG. 6. The length of the heating furnace was 5 m.

Figure 7:
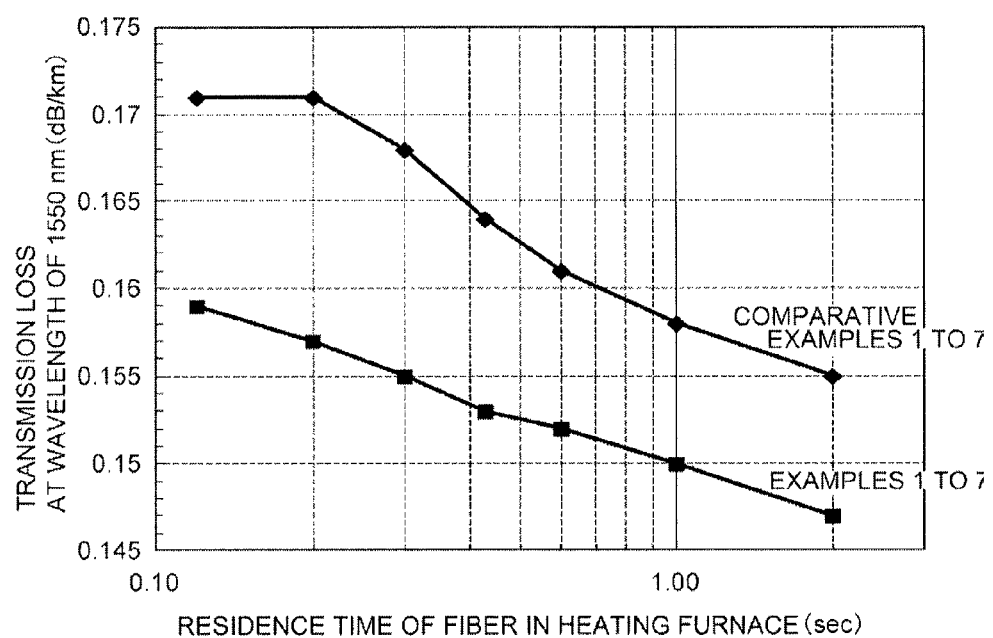
FIG. 7 is a graph showing the relationship between the residence time of an optical fiber in a heating furnace and the transmission loss of the optical fiber at a wavelength of 1550 nm for optical fibers in Examples and Comparative Examples.

FIG. 7 is a graph showing the relationship between the residence time of the optical fiber in the heating furnace and the transmission loss at a wavelength of 1550 nm for each of the optical fibers in Examples 1 to 7 and Comparative Examples 1 to 7. The temperature in the heating furnace in all of Examples 1 to 7 and Comparative Examples 1 to 7 was 1500° C. In the case of the pure silica core optical fibers in Comparative Examples, the residence time of the optical fiber in the heating furnace needs to be 1.0 second or more in order to achieve an transmission loss of 0.158 dB/km or less at a wavelength of 1550 nm. When the residence time of the optical fiber in the heating furnace is 1.0 second, the transmission loss of the alkali metal-doped silica core optical fibers in Examples can be reduced by about 0.008 dB/km compared with the pure silica core optical fibers in Comparative Examples.

FIGS. 8 and 9 are tables each showing a transmission loss increase with or without a deuterium treatment for each of the optical fibers in Examples 1 to 7 and 15 to 21 and Examples 29 to 42, respectively. FIGS. 8 and 9 show a transmission loss increase at a wavelength of 1550 nm, a maximum transmission loss increase at wavelengths of 1530 nm to 1570 nm, a maximum transmission loss increase at wavelengths of 1560 nm to 1620 nm, and a transmission loss increase at a wavelength of 1380 nm with or without a deuterium treatment. The transmission loss increase refers to an increase between the transmission loss after the hydrogen treatment and the transmission loss before the hydrogen treatment. At all wavelengths, the optical fibers subjected to the deuterium treatment had a small transmission loss increase.

The transmission loss increase of the optical fiber with or without the deuterium treatment is evaluated as follow.
(1) Two optical fibers having a length of 2 km were prepared for each of Examples 1 to 7 and 15 to 21.
(2) In each of Examples, one of the optical fibers was subjected to a deuterium treatment at a deuterium gas partial pressure of 2 kPa at 40° C. for 24 hours. Subsequently, the optical fiber was left to stand in the air at room temperature for two weeks or more in order to remove deuterium left in glass as a molecule without being reacted with the glass.
(3) The transmission loss (initial transmission loss) of the two optical fibers in each of Examples was measured.
(4) The two optical fibers in each of Examples were left to stand at 25° C. for 720 hours (30 days) in an atmosphere containing hydrogen gas with a partial pressure of 1 kPa. Subsequently, the optical fibers were left to stand in the air at room temperature for two weeks or more in order to remove hydrogen left in glass as a molecule without being reacted with the glass.
(5) The transmission loss (transmission loss after the hydrogen treatment) of the two optical fibers in each of Examples was measured.
(6) A transmission loss increase was determined by subtracting the initial transmission loss from the transmission loss after the hydrogen treatment.

Figure 10:
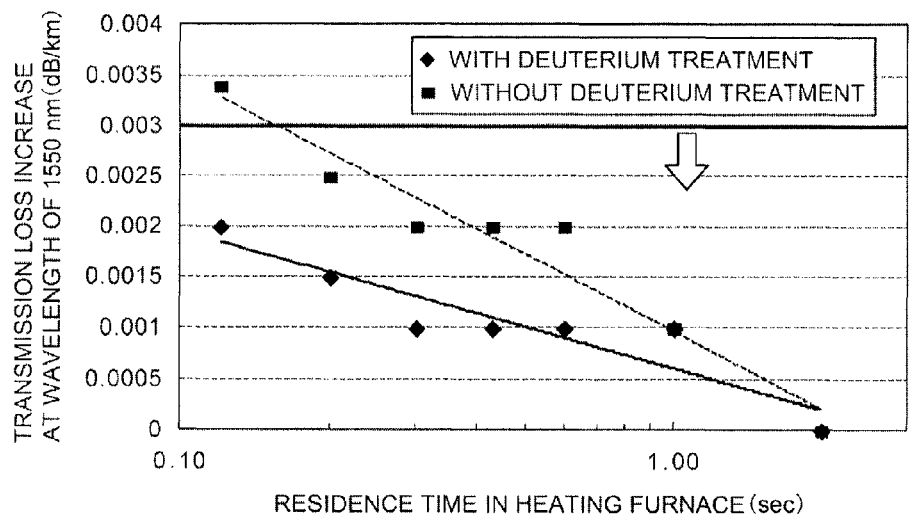
FIG. 10 is a graph showing the relationship between the residence time of an optical fiber in a heating furnace and the transmission loss increase of the optical fiber at a wavelength of 1550 nm with or without a deuterium treatment for optical fibers in Examples.
Figure 11:
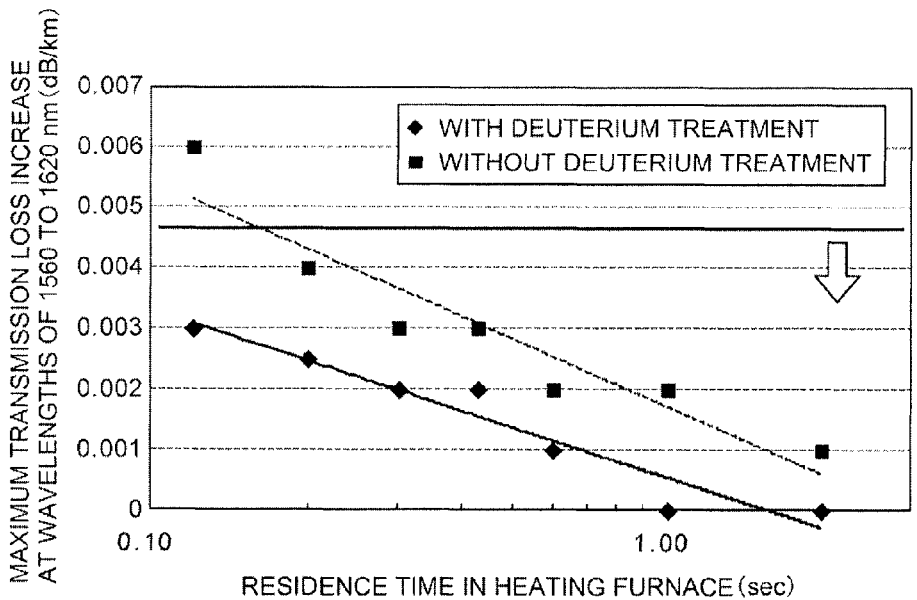
FIG. 11 is a graph showing the relationship between the residence time of an optical fiber in a heating furnace and the maximum transmission loss increase of the optical fiber at wavelengths of 1560 nm to 1620 nm with or without a deuterium treatment for optical fibers in Examples

FIG. 10 is a graph showing the relationship between the residence time of the optical fiber in the heating furnace and the transmission loss increase of the optical fiber at a wavelength of 1550 nm with or without the deuterium treatment for each of the optical fibers in Examples 1 to 7. In the case where the optical fiber was subjected to the deuterium treatment, but was not heated in the heating furnace, the transmission loss increase at a wavelength of 1550 nm was 0.0023 dB/km. FIG. 11 is a graph showing the relationship between the residence time of the optical fiber in the heating furnace and the maximum transmission loss increase of the optical fiber at wavelengths of 1560 nm to 1620 nm with or without the deuterium treatment for each of the optical fibers in Examples 1 to 7. In the case where the optical fiber was subjected to the deuterium treatment, but was not heated in the heating furnace, the maximum transmission loss increase at wavelengths of 1560 nm to 1620 nm was 0.0033 dB/km.

As is clear from the drawings, when the deuterium treatment is performed, the transmission loss increase caused by the hydrogen treatment can be suppressed by heating a drawn optical fiber in the heating furnace. It is also found that no effect is produced when the residence time of the optical fiber in the heating furnace is short (less than 0.2 seconds), and thus the residence time of the optical fiber in the heating furnace is desirably 0.2 seconds or more.

In the optical fibers subjected to the deuterium treatment, the transmission loss increase after the hydrogen treatment can be reduced by about 0.001 dB/km compared with the optical fibers not subjected to the deuterium treatment. For example, by performing the deuterium treatment, the transmission loss increase of the optical fiber at a wavelength of 1550 nm can be controlled to 0.002 dB/km or less regardless of the residence time of the optical fiber in the heating furnace, and the transmission loss increase at wavelengths of 1560 nm to 1650 nm can be controlled to 0.003 dB/km or less. Furthermore, for example, if the transmission loss increase of the optical fiber at a wavelength of 1550 nm needs to be controlled to 0.003 dB/km or less and the transmission loss increase at wavelengths of 1560 nm to 1620 nm needs to be controlled to 0.005 dB/km or less regardless of the presence or absence of the deuterium treatment, the residence time in the heating furnace may be set to be 0.2 seconds or more. Moreover, by increasing the residence time of the optical fiber in the heating furnace, the transmission loss increase of the optical fiber can be suppressed regardless of the presence or absence of the deuterium treatment.

INDUSTRIAL APPLICABILITY

The optical fiber can be used as a long-haul, large-capacity optical transmission line, such as a submarine cable.

The invention claimed is:

1. A method for producing an optical fiber, comprising:
a drawing step of drawing an optical fiber preform in a drawing furnace to produce a silica glass-based optical fiber including a core region containing an alkali metal with an average concentration of 0.5 atomic ppm or more and a cladding region that surrounds the core region; and
a heating step of heating the optical fiber in a heating furnace through which the optical fiber drawn from the drawing furnace passes.

2. The method for producing an optical fiber according to claim 1, wherein in the heating step, a temperature in the heating furnace is 700° C. or more.

3. The method for producing an optical fiber according to claim 1, wherein in the heating step, a residence time of the optical fiber in the heating furnace is 0.2 seconds or more.

4. The method for producing an optical fiber according to claim 1, wherein in the heating step, a product of a residence time of the optical fiber in the heating furnace and an average temperature in the heating furnace is 480 (s·° C.) or more.

5. The method for producing an optical fiber according to claim 1, wherein a drawing speed in the drawing step is 150 m/min or more.

6. The method for producing an optical fiber according to claim 1, wherein the alkali metal is potassium.

* * * * *